May 19, 1959     P. M. DE WOLFF ET AL     2,887,585

X-RAY DIFFRACTION METHOD AND APPARATUS

Filed May 17, 1955

INVENTOR.
PIETER MAARTEN DE WOLFF
WILLIAM PARRISH
BY
AGENT.

United States Patent Office
2,887,585
Patented May 19, 1959

2,887,585
X-RAY DIFFRACTION METHOD AND APPARATUS

Pieter Maarten de Wolff, Delft, Netherlands, and William Parrish, Hastings on Hudson, N.Y., assignors to North American Philips Company, Inc., New York, N.Y., a corporation of Delaware Application May 17, 1955, Serial No. 509,056

3 Claims. (Cl. 250—53)

Our invention relates to a method and apparatus for obtaining X-ray diffraction patterns of improved resolution in the front reflection region, particularly at low reflection angles.

Diffraction patterns are usually obtained by measuring the reflected intensity as a function of the reflection angles. Since all specimens produce secondary fluorescent X-rays when irradiated by primary X-rays, this increases the general X-ray background making it difficult to measure intensities accurately.

Furthermore, the primary X-ray beam consists of a few strong characteristic lines superimposed upon a wide continuous band of wavelengths. The strong characteristic lines produce the diffraction lines of the pattern but the continuous radiation is scattered in all directions and hence also increases the background, making it difficult to measure intensities accurately. Moreover, it is well known that the characteristic lines generally are multiple lines of closely-spaced wavelengths which cause a distortion of the shape and broadening of the diffracted lines—this distortion varying with the diffraction angle $2\theta$.

In many instances it is necessary to measure small diffraction angles and in known instruments these angular measurements may be in considerable error due to difficulties in alignment and certain geometrical aberrations, such as caused by the use of a flat rather than a curved specimen and inaccuracies in the preparation of the specimen. These errors continuously increase with decreasing diffraction angle in the case of the diffractometer described in U.S. Patent 2,549,987 to Parrish et al.

The principal object of our invention is to provide a method and apparatus for obtaining diffraction patterns of X-ray transparent specimens to yield valuable information regarding the structure of such materials in the front reflection region, particularly at low reflection angles.

A further object of our invention is to provide a method and apparatus for obtaining X-ray diffraction patterns relatively free from background.

Another object of our invention is to obtain X-ray diffraction patterns of high resolution without seriously impairing intensity.

These and further objects of our invention will appear as the specification progresses.

When an X-ray beam impinges upon a thin specimen relatively transparent to X-rays, the X-rays diffracted by the specimen emerging from the side of the specimen remote from the incident beam can be reflected by a bent crystal oriented to reflect X-rays to a suitable detector. Furthermore, when the bent crystal and detector are linked together and rotate at twice the angular speed of the specimen, proper focussing conditions can be maintained for all reflection angles and a diffraction pattern thus can be obtained.

Since the wavelength of fluorescent radiation nearly always differs considerably from that of the characteristic line used for diffraction, any fluorescent radiation emerging from the crystal in this arrangement is reflected—if at all—in a different direction and can be suppressed completely by a slit placed before the detector. The same slit virtually suppresses the white spectrum and could also be used in order to suppress the weaker of the two components of the $K\alpha$ doublet line, thereby increasing the resolving power.

In accordance with our invention, we interpose between the X-ray source and the specimen or between the reflecting crystal and the detector, or both, a special parallel-slit collimator for limiting the divergence of either the primary or reflected beam of X-rays, or both, in a plane containing an axis about which the specimen rotates, i.e., vertical divergence of the X-ray beam is limited in order to obtain a sharply defined beam of X-radiation. We have found that such a collimator improves the resolution of the diffracted beam without seriously impairing its intensity.

In a further embodiment of our invention we interpose between the specimen and a reflecting crystal a thin sheet of X-ray absorbent material mounted perpendicular to a plane containing the axis of rotation for suppression of scattered radiation from the bent crystal at small diffraction angles.

In a still further embodiment of our invention the specimen is positioned more nearly perpendicular to the primary X-ray beam and rotates at the same angular speed as the detector and the focussing crystal, all three being linked together, to cover the higher angle front reflection region more effectively.

The invention will now be described in connection with the accompanying drawing in which.

Figures 1, 2:
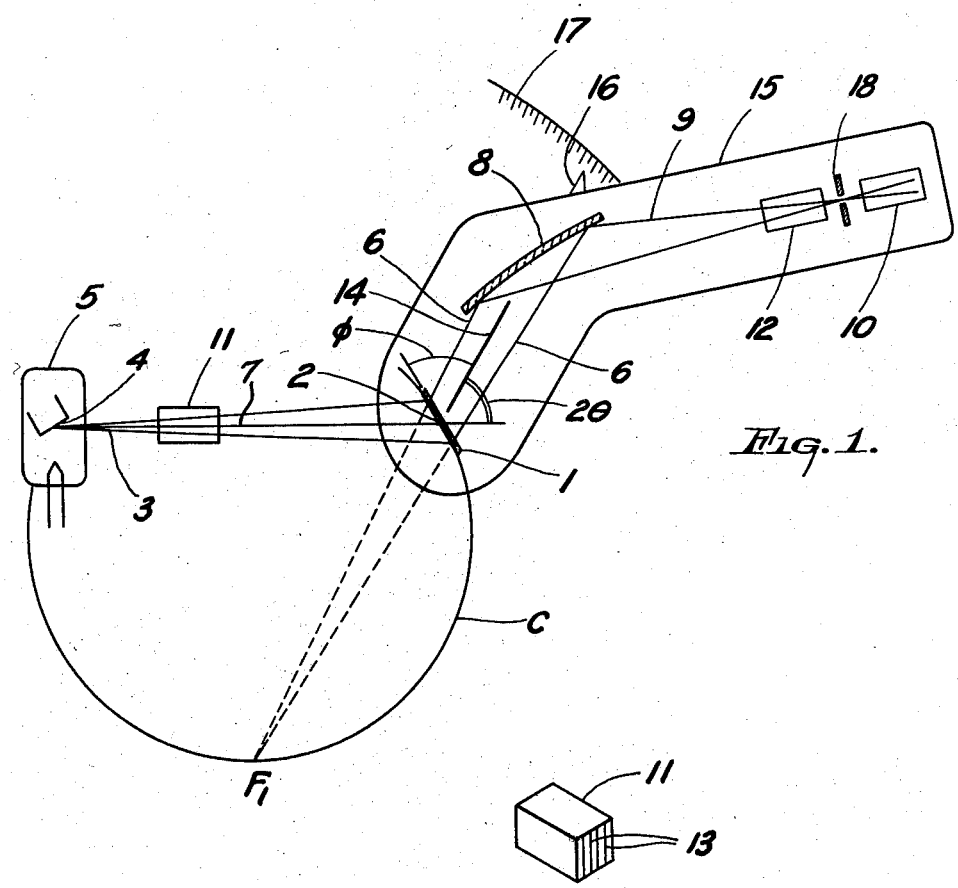
Fig. 1 shows an apparatus according to the invention.
Fig. 2 shows a collimator used in the apparatus according to the invention.

In Fig. 1 a specimen 1 is mounted for rotation about an axis 2. X-rays 3 generated by a target 4 of an X-ray tube 5 are directed at and impinge upon one side of the specimen and are diffracted in their passage through the specimen. The emergent X-ray beam 6 forming an angle $2\theta$ with the primary beam axis 7 is reflected by a bent crystal 8 which may be formed of any crystalline substance which can be bent without breaking up its crystallinity, such as for example, mica or quartz, or it may be formed by a multiplicity of small crystals on a curved support. Reflected rays 9 enter a suitable detector 10, such as a Geiger-Müller counter, proportional counter, scintillation counter or camera which measures or records the intensity of the radiation, through a receiving slit 18.

Crystal 8, parallel slit assembly 12, receiving slit 18 and detector 10 are mounted on a common rigid arm 15 which rotates around the specimen axis of rotation 2. This arm rotates at twice the angular speed of the specimen.

As the detector is rotated, the emergent or diffracted beam 6 reflected by the bent crystal varies in intensity and the intensities measured at various angles ($2\theta$) are an index of the composition and structure of the material. In order to obtain better resolution and line shape, we interpose collimators 11 and 12 between the X-ray tube and the specimen or between the reflecting crystal and the detector, or between both. As shown in Fig. 2, the collimator comprises an assembly of parallel mounted sheets 13, each of which is impervious to X-radiation. The collimators are positioned so that these sheets are perpendicular to a plane containing the axis of rotation of the crystal whereby the divergence of the incident and emergent beams in a plane containing the axis of rotation are limited.

In order to increase the resolution still further it is desirable to view the target of the X-ray tube at very low angles so that in effect the focal spot appears as a projected line source of radiation. Viewed in this manner, the incident beam, in the absence of the collimator, would appear very broad and cause asymmetric line profiles. However, with the collimator interposed between the source and the specimen, the source is broken up into a plurality of virtual point sources of radiation each of which provides a sharply defined beam of X-radiation.

In order to further extend the useful range of the instrument to lower diffraction angles in the front reflection region a thin absorbing planar sheet 14 containing the central axis of the emergent beam 6 and the axis of rotation 2 is positioned between specimen 1 and crystal 8. At lower diffraction angles, i.e. as arm 15 is moved clock-wise, crystal 8 will intercept and reflect undiffracted primary X-radiation passing through the specimen. The planar sheet 14, however, absorbs the undiffracted primary X-radiation and reduces by a factor of approximately two the angle at which the primary beam begins to impinge upon the crystal.

In order to extend the useful range of the instrument to higher diffraction angles where the angle of incidence between the primary beam and the specimen decreases thereby increasing the effective path length in the specimen, the following modification of the above-described method may be desirable. The specimen 1 is now oriented nearly normal to the primary beam axis when the crystal and detector assembly are set for reflections in the region exceeding 40° $2\theta$. The specimen 1, crystal 8, parallel slit assembly 12, receiving slit 18 and detector 10 are made to rotate together at the same angular speed on arm 15. In the instrument described this is most easily accomplished by coupling the specimen directly to the arm through a clutch (not shown) so that at higher angles, the specimen rotates at the same speed as the detector, receiving slit, parallel slit assembly and crystal. Once the crystal has been adjusted the coincidence of the virtual focal line $F_1$ of the crystal and the focal circle C tangent to the specimen and passing through the focal spot is maintained for all angles as in the previous method, but only for a limited range and only approximately in this one because axis 2 is now not equidistant from $F_1$ and the source. This arrangement thus is satisfactory only over a restricted angular region whereas the previous arrangement is satisfactory over a greater angular region.

While we have described our invention with specific examples and applications thereof, other modification will be apparent to those skilled in this art without departing from the spirit and scope of our invention as defined in the appended claims.

What we claim is:

1. An X-ray diffractometer comprising means for supporting in the path of a primary X-ray beam diverging from a source of X-rays and X-ray diffraction transmission specimen in order that the X-rays may be transmitted therethrough by diffraction in the form of a diverging secondary X-ray beam having a virtual focus, the supporting means being rotatably adjustable about an axis substantially perpendicular to the primary beam, a reflection crystal monochromator disposed in the path of the diverging secondary X-ray beam for reflecting the diverging secondary X-ray beam into a beam of X-rays converging to a second focus, a thin planar sheet perpendicular to the axis of rotation of the specimen and disposed between the specimen and the reflection crystal monochromator for absorbing scattered radiation from the crystal at small reflection angles, a detector disposed in the path of the secondary diverging beam of X-rays, and a collimating system interposed between the detector and the reflection crystal monochromator to limit the divergence of the secondary beam in a plane containing the axis of rotation of said specimen, said collimating system comprising a plurality of spaced parallel sheets of X-ray impervious material mounted perpendicular to the axis of rotation of the specimen.

2. An X-ray diffractometer comprising means for supporting in the path of a primary X-ray beam diverging from a source of X-rays an X-ray diffraction transmission specimen in order that the X-rays may be transmitted therethrough by diffraction in the form of a diverging secondary X-ray beam having a virtual focus, the supporting means being rotatably adjustable about an axis substantially perpendicular to the primary beam, a collimating system interposed between the source of primary X-rays and the specimen to limit the divergence of the primary beam in a plane containing the axis of rotation of said specimen, a reflection crystal monochromator disposed in the path of the diverging secondary X-ray beam for reflecting the diverging secondary X-ray beam into a beam of X-rays converging to a second focus, a thin planar sheet perpendicular to the axis of rotation of the specimen and disposed between the specimen and the reflection crystal monochromator for absorbing scattered radiation from the crystal at small reflection angles, a detector disposed in the path of the secondary diverging beam of X-rays, and a collimating system interposed between the detector and the reflection crystal monochromator to limit the divergence of the secondary beam in a plane containing the axis of rotation of said specimen, each of said collimating systems comprising a plurality of spaced parallel sheets of X-ray impervious material mounted perpendicular to the axis of rotation of the specimen.

3. An X-ray diffractometer comprising means for supporting in the path of a primary X-ray beam diverging from a source of X-rays an X-ray diffraction transmission specimen in order that the X-rays may be transmitted therethrough by diffraction in the form of a diverging secondary X-ray beam having a virtual focus, the supporting means being rotatably adjustable about an axis substantially perpendicular to the primary beam, a reflection crystal monochromator disposed in the path of the diverging secondary X-ray beam for reflecting the diverging secondary X-ray beam into a beam of X-rays converging to a second focus, a thin planar sheet perpendicular to the axis of rotation of the specimen and disposed between the specimen and the reflection crystal monochromator for absorbing scattered radiation from the crystal at small reflection angles, a detector disposed in the path of the secondary diverging beam of X-rays, a collimating system interposed between the detector and the reflection crystal monochromator to limit the divergence of the secondary beam in a plane containing the axis of rotation of said specimen, said collimating system comprising a plurality of spaced parallel sheets of X-ray impervious material mounted perpendicular to the axis of rotation of the specimen, and means for rotatably adjusting the specimen, the thin planar sheet, the collomiating system and the detector about said axis of rotation at the same rate of rotation about said axis.

References Cited in the file of this patent

UNITED STATES PATENTS

| | | |
|---|---|---|
| 2,449,066 | Friedman | Sept. 14, 1948 |
| 2,532,810 | Harker | Dec. 5, 1950 |
| 2,549,987 | Parrish et al. | Apr. 24, 1951 |
| 2,805,343 | Lang | Sept. 3, 1957 |